Patented Oct. 17, 1944

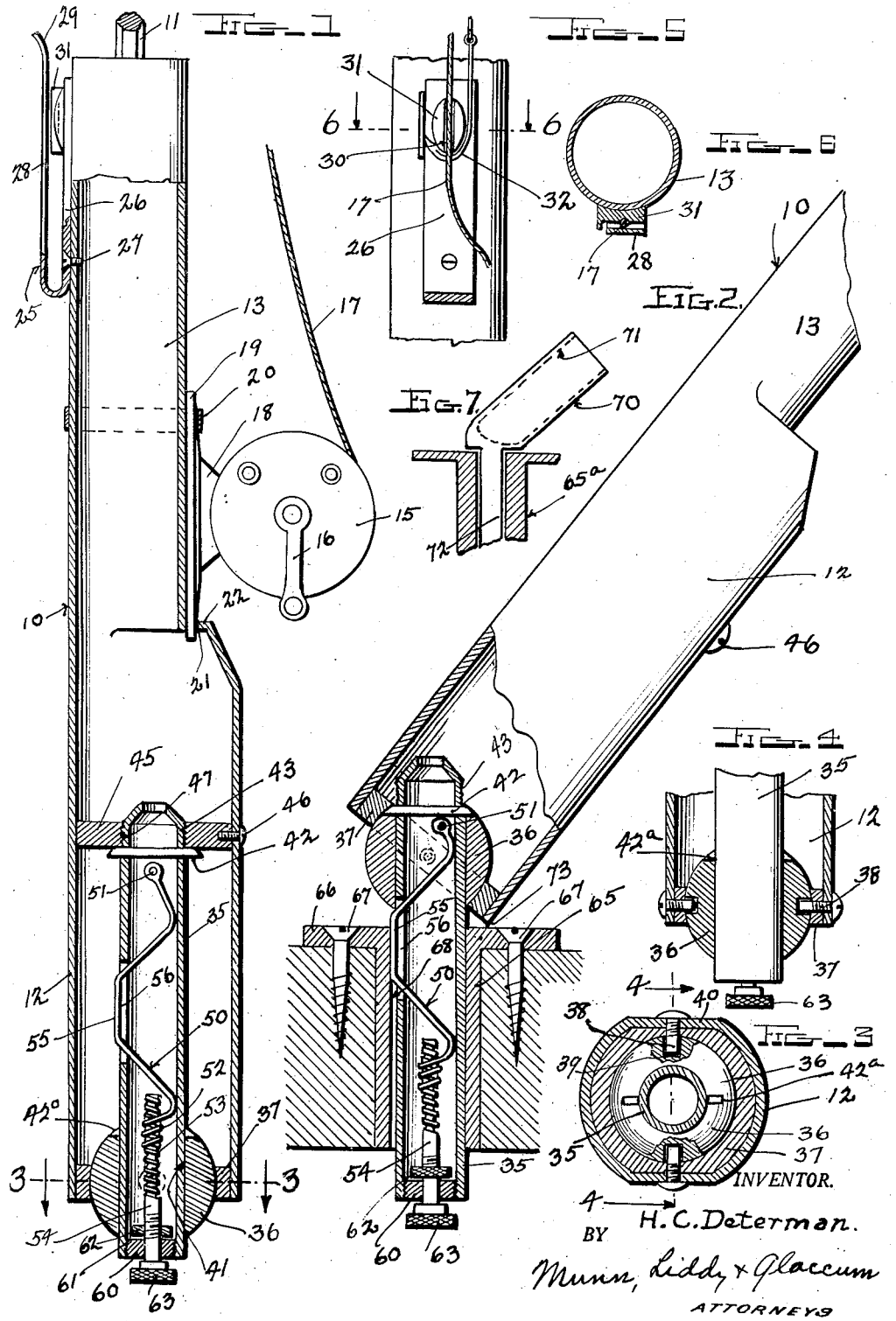

2,360,402

UNITED STATES PATENT OFFICE 2,360,402

FISHING POLE

Henry C. Determan, Mason City, Iowa

Application July 20, 1943, Serial No. 495,475

10 Claims. (Cl. 43—23)

This invention relates to fishing rods, and is more particularly directed to a device for maintaining said rod in a predetermined operative position.

An object of the invention is the provision of a device forming an attachment to the handle of a fishing rod which may be withdrawn and received within a socket formed in a boat or wharf for retaining the rod in an elevated position when the line and appurtenances have been discharged into a body of water.

Another object of the invention is the provision of a device for retaining a fishing rod in a predetermined position at various times with the device being adapted to be housed completely within the handle of the rod or extended to be received within a fixed socket for supporting the pole in a predetermined position with means included in the device for preventing rotation of said device in this socket.

A further object of the invention is the provision of a device incorporated in the handle of a fishing rod with the device being capable of being withdrawn from the handle and received by a fixed socket for supporting the pole at an angle to the vertical at various times, said device being in the form of a sleeve slidably mounted in a rockable joint, so that it may be housed within the handle or be withdrawn partially therefrom to be received by a socket for supporting the fishing rod at various angles to the vertical.

A further object of the invention is the provision of a fishing pole having a spring clip cooperating with a grooved portion to receive the fishing hook and to maintain the line in the groove against movement when the fishing pole is not in use.

This invention will be best understood from a consideration of the following detailed description, in view of the accompanying drawing forming a part of the specification, nevertheless, it is to be understood that the invention is not confined to the disclosure, being susceptible of such changes and modifications as define no material departure from the salient features of the invention as expressed in the appended claims.

In the drawing:

Fig. 1 is a vertical section of a handle of a fishing pole constructed according to the principles of my invention.

Fig. 2 is a view in elevation and partly in section of the handle shown supported by a device connected with the handle and received by a fixed socket.

Fig. 3 is a horizontal section taken along the line 3—3 of Fig. 1.

Fig. 4 is a vertical section taken along the line 4—4 of Fig. 3.

Fig. 5 is a fragmentary side view of the handle showing means for retaining the line and hook in an inoperative position.

Fig. 6 is a horizontal section taken along the lines 6—6 of Fig. 5.

Fig. 7 is a side view partly in section of a modified form of the fishing pole holder.

Referring more particularly to the drawing 10 generally designates the handle of a fishing rod 11. This handle is hollow and may be formed of metal or any suitable material. This handle has an enlarged portion 12 which is adapted to be clasped by the hand and this enlarged portion extends downwardly from a section 13 of smaller diameter.

The section 13 includes the usual reel 15 having an operating handle 16 and a line 17 extended therefrom. Said reel is carried by a bracket 18 having a plate 19 which engages the outer wall of the section 13 of the handle and this plate is held in position by means of a ring 20 and an opening 21 formed in a shouldered portion 22 where the narrow section 13 joins the wider section 12. It will be seen from Fig. 1 that one end of the plate 19 is received by the opening 21.

The section 13 is provided with a spring clip generally designated by the numeral 25 and this spring clip has a base portion 26 secured at 27 to the outer wall of the section 13. The clip also has a spring arm 28 which extends parallel to the base portion 26 with its free end 29 turned outwardly to facilitate the insertion of the line 17 into a groove 30 of a button or projection 31 that is secured to or formed integrally with the base portion 26 of the clip.

When the line is not in use the outer hook 32 engages around the button 31 as shown in Fig. 5, while the line 17 is located in the groove 30 with the spring arm 28 pressing upon the line and hook and holding it frictionally against the surface of the groove.

The larger section 12 of the handle is provided with a slidable sleeve 35 which is mounted in a ball 36 rockably mounted in a ring 37 which is secured in the outer open end of the handle 12. The ball is provided with pockets 39 at diametrically opposite points to receive the inner ends of pivot bolts or pins 38 which are threaded through passages in the hollow section 12 of the handle and the ring 37. The bolts or pins 38 are in effect trunnions for rockably supporting the ball 36. The opposite side walls of the hollow section 12 may be flattened as shown at 40 as are the contacting surfaces of the ring 37. From this construction it will be seen that the ball will rock on substantially a horizontal diameter in opposite directions.

The ball is provided with a central passage 41 which slidably receives the sleeve 35. The sleeve is limited in its inward or outward movement by a pin 42 which is mounted in the inner threaded end 43 of the sleeve. Said pin is received by a groove 42ᵃ (Fig. 2) to prevent the sleeve 35 from turning when extended.

A disk 45 is located within the hollow section 12 of the handle and is secured to the walls of said section by means of screws or threaded bolts 46. This sleeve is made of metal and has an internally threaded passage 47 to receive the threaded end 43 of the sleeve 35. When said sleeve has been moved within the hollow handle and rotated so that it will be screwed into the threaded passage 47 to retain the sleeve substantially housed within the handle when the sleeve is not being used for a particular purpose which will be presently described.

When the sleeve 35 has been unscrewed from the nut or disk 45 it may be partially withdrawn from the section 12 of the handle by reason of the fact that it is slidably mounted within the passage 41 of the ball 36. However, when the pin 42 reaches the inner portion of the ball 36 and is received by the groove 42ᵃ further outward movement of the sleeve is prevented.

A spring wire 50 has its inner end secured at 51 to the sleeve 35 and this wire is located within the sleeve. The other end of the wire is coiled as shown at 52 and is secured to a threaded portion 53 of a pin or bolt 54. The intermediate portion of this wire as shown at 55 is bent to form an extension which projects through a slot 45 formed in the sleeve 35.

The bolt 54 is rotatably mounted in a closure 60 which is threaded into the outer end of the sleeve 35 and the closure is provided with a central passage to receive the bolt. This bolt is also provided with threads 61 upon which a nut 62 is screwed to prevent the loss of the bolt from the sleeve since the nut is located within the sleeve and inwardly of the closure 60. A manipulating knob 63 is secured to the outer end of the bolt and may be clasped by the fingers, for rotating the bolt and winding the outer end of the spring on the threaded portion of the bolt to cause the projecting portion 55 of the resilient wire 50 to be withdrawn from the slot so that the projecting portion will be located within the sleeve.

The sleeve 35 when withdrawn from the section 12 of the handle is adapted to be received by the usual fixed socket 65 which is found in a boat and which is adapted to receive the usual oar lock. This lock is usually made of metal and is provided with a flange 66 which is secured at 67 to the boat. The member 65 is usually open at one end so that the sleeve 35 may extend through the passage 68 and the member 65. When the sleeve 35 is inserted within the passage 68 the projecting portion 55 of the spring 50 will engage a portion of the side wall 68 of the member 65 and retain the sleeve against rotation.

In Fig. 7 is shown a modified form of socket and it consists of an angularly disposed sleeve 70 having a pocket 71 to receive the end of a fishing rod. A pin 72 projects downwardly from the inner end of the socket and is received by a fixed socket 65ᵃ which may be the usual oar lock in a boat or it may be a pocket formed on a wharf or other fixed structure.

It will be noted from Fig. 2 that the handle 10 may be held at an angle to the vertical and the angle will be determined in part by the depth to which the sleeve 35 is inserted within the socket 65. However, the descent of the sleeve 35 in the socket 65 is limited by the ball 36. In the position shown in Fig. 2 a portion of the outer edge 73 of the section 12 of the handle will fractionally engage the flange 66 and aid in maintaining the angular position of the handle. When the sleeve is raised or lowered within certain limits the angle of the handle may be changed since the portion of the edge 73 of the section 12 will engage the flange 66 at different points.

It would seem from the above that the fishing pole handle is adapted to be mounted in the usual oarlock or in an opening especially provided to receive the sleeve 35, and retaining the pole in a predetermined position. The rotation of the pin 54 in one direction causes the wire 50 to retract the portion 55 for releasing the sleeve 35 from the socket while rotation in the opposite direction causes the member 55 to be projected in frictional contact with the walls of a fixed socket.

When the fishing pole is not in use the sleeve 35 is moved to its retracted position as shown in Figure 1, and the hook 32 of the line is held in place as shown in Figure 5. The line 17 is also clamped against slippage.

I claim:

1. In a fishing pole, a hollow handle having a ball and socket joint, said ball being provided with a passage therethrough, a threaded nut secured within the handle, and a sleeve slidable in the passage and having the inner end removably threaded into the nut, said sleeve being adapted to be partially withdrawn from the handle and received within a fixed socket for supporting the fishing pole in an elevated position.

2. In a fishing pole, a hollow handle having a ball and socket joint, said ball being provided with a passage therethrough, a nut secured within the handle, a sleeve slidable in the passage and having the inner end removably threaded into the nut, said sleeve being adapted to be partially withdrawn from the handle and received within a fixed socket for supporting the fishing pole in an elevated position, and a resilient detent adapted to frictionally engage the walls of the socket to prevent rotation of the sleeve in the socket.

3. In a fishing pole, a hollow handle having a ball and socket joint, said ball being provided with a passage therethrough, said ball having diametrically disposed trunnions carried by the socket, a nut secured within the handle, and a sleeve slidable in the passage and having the inner end removably threaded into the nut, said sleeve being adapted to be partially withdrawn from the handle and be received within a fixed socket for supporting the fishing pole in an elevated position.

4. In a fishing pole, a hollow handle having a ball and socket joint, said ball being provided with a passage therethrough, a nut secured within the handle, a sleeve slidable in the passage and having its inner end removably threaded into the nut, said sleeve being adapted to be partially withdrawn from the handle and be received within a fixed socket for supporting the fishing pole in an elevated position, a detent preventing rotation of the sleeve in the socket and manual means for releasing the detent for removing the sleeve from the fixed socket.

5. In a fishing pole, a hollow handle provided at the outer end thereof with a ball and socket joint, said ball having a passage therethrough and diametrically disposed trunnions carried by the socket so that the ball will rock in one direction, a nut located within the handle and fixed thereto, a sleeve slidable in the passage and having its inner end threaded into the nut when the sleeve is housed within the handle, said sleeve when partially withdrawn from the handle being adapted to be received within a fixed socket for supporting the pole in an elevated position, and means for retaining the sleeve extended from the handle and for retaining the sleeve against rotation in the fixed socket.

6. In a fishing pole, a hollow handle provided at the outer end thereof with a ball and socket joint, said ball having a passage therethrough, and diametrically disposed trunnions carried by the socket so that the ball will rock in one direction, a nut located within the handle and fixed thereto, a sleeve slidable in the passage and having its inner end threaded into the nut when the sleeve is housed within the handle, said sleeve when partially withdrawn from the handle being adapted to be received within a fixed socket for supporting the pole in an elevated position, means preventing the sleeve from being withdrawn from the passage while limiting rocking movement of the handle on the sleeve, and means for retaining the sleeve extended from the handle and for retaining the sleeve against rotation in the fixed socket.

7. In a fishing pole, a hollow handle having a ball and socket joint, said ball being provided with a passage therethrough, a nut secured within the handle, a sleeve slidable in the passage and having the inner end removably threaded into the nut, said sleeve being adapted to be partially withdrawn from the handle and received within a fixed socket for supporting the fishing pole in an elevated position, a manually rotated pin in the outer end of the sleeve, said sleeve being provided with an elongated slot, and a resilient wire having one end secured to the sleeve, the other end of the wire being secured to the pin; the intermediate portion of the wire being bent and being adapted to project through the slot for engagement with the walls of the fixed socket, rotation of the pin in one direction causing the bent portion of the wire to be retracted from the slot to permit withdrawal of the sleeve from said fixed socket.

8. A fishing pole having a hollow handle forming a housing and being provided with a ball and socket at the outer end, said ball having a horizontal pivot in the socket and a diametrically disposed passage, a sleeve in the housing slidable in the passage and being adapted to be drawn outwardly from said housing, and a pin mounted in the inner end of the sleeve to prevent the withdrawal of said sleeve from the housing, said ball having a slot to receive the pin to prevent rotation of the sleeve when said sleeve is drawn outwardly.

9. A fishing pole having a hollow handle forming a housing and being provided with a ball and socket at the outer end, said ball having a horizontal pivot in the socket and a diametrically disposed passage, a sleeve in the housing slidable in the passage and being adapted to be drawn outwardly from said housing, and cooperating means on the sleeve and ball to prevent rotation of the sleeve when said sleeve is drawn sufficiently outwardly from the handle.

10. A fishing pole having a hollow handle forming a housing and being provided with a ball and socket at the outer end, said ball having a horizontal pivot in the socket and a diametrically disposed passage, a sleeve in the housing slidable in the passage and being adapted to be drawn outwardly from said housing, and cooperating means on the sleeve and ball to prevent rotation of the sleeve when said sleeve is drawn sufficiently outwardly from the handle, said cooperating means preventing the entire withdrawal of the sleeve from the handle.

HENRY C. DETERMAN.